Aug. 29, 1933.     H. E. LA BOUR     1,924,407
GLAND
Filed April 4, 1931
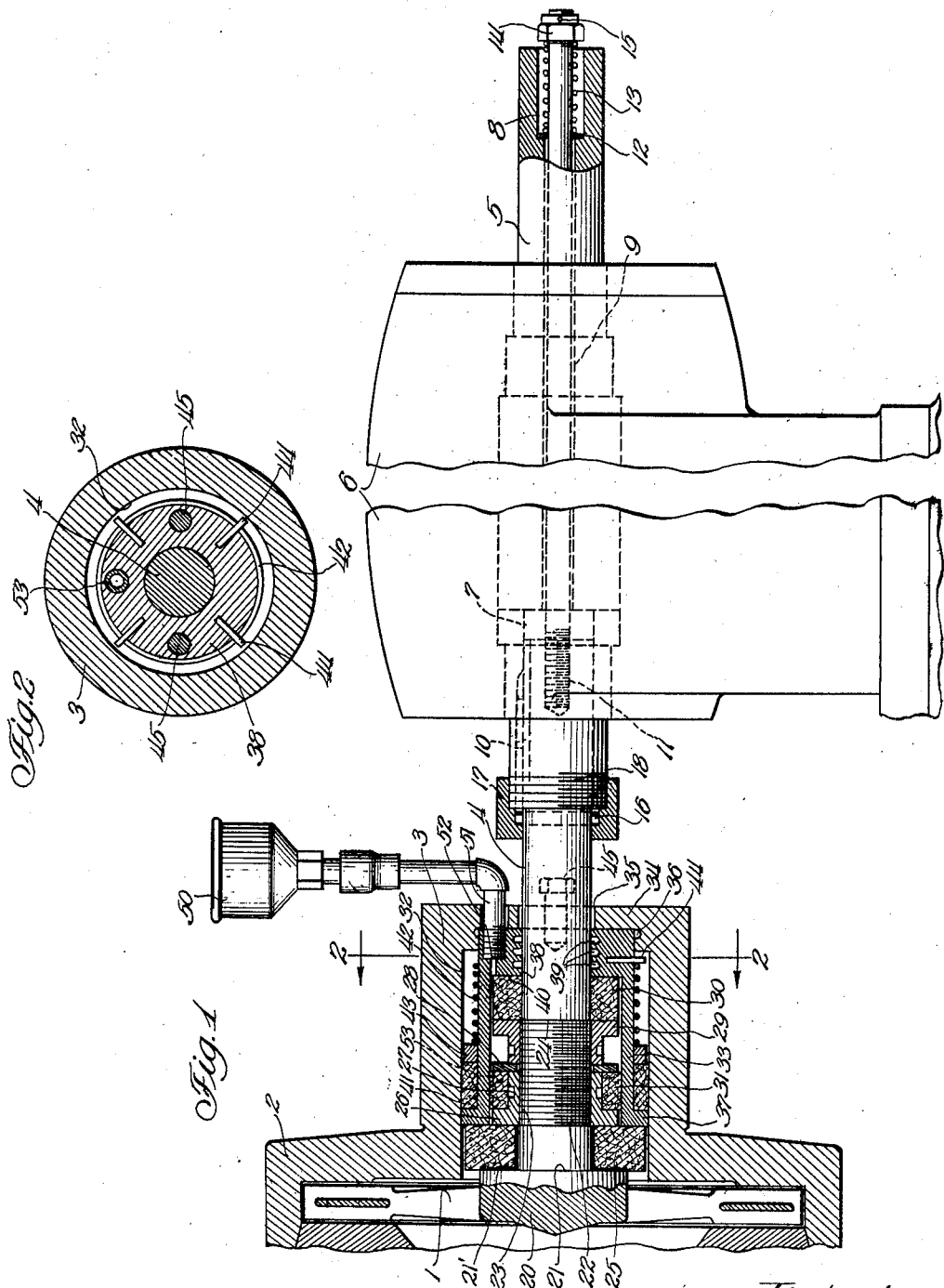
Inventor
Harry E. LaBour
By [signature]
Attys.

Patented Aug. 29, 1933

1,924,407

UNITED STATES PATENT OFFICE 1,924,407

GLAND

Harry E. La Bour, Elkhart, Ind.

Application April 4, 1931. Serial No. 527,816

11 Claims. (Cl. 103—111)

This invention relates to packing glands.

The problem of providing a packing gland which will tightly seal the impeller shaft of a pump to the casing without imposing great power losses due to friction, is present in all types of pumps, and the problem is much more acute in pumps which are employed to move corrosive acids or solutions in which sharp abrasives are held in suspension. In the case of pump handling a corrosive liquid if the packing gland is not properly adjusted, liquid is permitted to leak past it, or at least partially past it, with the result that the deterioration of the packing material itself is greatly speeded up. For this reason, a packing gland to be satisfactory must be fool-proof so that it will maintain itself in proper adjustment almost without regard to the manner of its handling by the operator of the pump. The same is of course true in the case of pumps employed to move liquids containing suspended abrasives, since if such liquids and abrasives are permitted to leak into the packing or past it, the shaft and packing material are rapidly worn away and must soon be replaced.

My present invention provides a new and improved packing gland which is capable of tightly sealing corrosives or liquids and liquids containing suspended abrasive particles, the packing gland being easily maintained in proper adjustment so that it may operate efficiently even when manipulated by inexperienced operators.

As a further object of my invention, I provide for the proper lubrication of the packing gland so that the power losses in it due to friction will be maintained low and the overall efficiency of the pump thereby raised, the lubricant also assisting in forming a tight seal.

My invention can best be understood by reference to the accompanying drawing in which the preferred embodiment of it is shown by way of example, and in which:

Figure 1 is an elevational view, partly in section, of a pump casing, containing an impeller sealed by my improved packing gland; and Figure 2 is a cross-sectional view taken along the line 2—2 of Figure 1, looking in the direction of the arrows.

Referring now to the drawing in more detail, I have shown my invention applied to a rotary pump in which the impeller 1 is supported concentrically in a generally cylindrical casing 2, that casing being provided with a cylindrical hub section 3 through which the impeller shaft 4 projects and in which the packing gland is located. It is the common practice in pumps of this type to support the casing 2 by means of a clamping member, not shown, which embraces and engages the outer face of the hub 3, such a construction being shown in detail in my copending application, Serial No. 374,409, filed June 28, 1929, to which application reference is here made for those details.

Located adjacent to the impeller shaft 4 is a power shaft 5 supported by a bearing indicated generally at 6 with its axis coinciding with the axis of the power shaft. Preferably the bearing 6 supports the power shaft 5 in such a manner that it is rigidly held against movement longitudinally of its axis, and serves as a rigid but rotatable support for the overhanging impeller. The particular construction of the bearing member 6 is not an essential part of the present invention, since any type of bearing may be used for that purpose, such as for example, the bearing structure shown in detail in my above-mentioned copending application.

The power shaft 5 contains a socket 7 in the pump end of it, and a smaller socket 8 in its motor end, these two sockets being connected by a cylindrical opening 9 concentrically located in the shaft.

The impeller shaft 4 is preferably formed integrally with the impeller 1, and the end portion of this shaft is formed to fit in the socket 7 in which it is held against rotation by a key 10 registering with keyways in the walls of the socket and in the impeller shaft. A tie rod 11 is rigidly attached to and projects from the end of the impeller shaft 4, being disposed in the opening 9 in the power shaft and extending completely through that shaft. The outer diameter of the tie rod 10 is substantially less than the diameter of the opening 9 so that the bar loosely fits in that opening. In the socket 8 in the motor end of the power shaft I place a washer 12 which snugly fits against the tie rod 10 and against which a compression spring 13 is footed, this spring being disposed around the rod 10 and in the socket 8. The end of the tie rod is threaded to receive a nut 14 threaded thereon to tension the compression spring 13. The nut 14 is preferably keyed against rotation in any preferred manner such as by the cotter pin 15.

With the nut 14 properly adjusted, spring 13 urges the tie rod and impeller shaft to the right, Figure 1, thereby urging the impeller shaft farther into the socket 7 in the power shaft. To limit the movement of the impeller and its shaft I have provided a pin 16 projecting through the impeller shaft, and have threaded a flanged collar 17 upon the threaded end 18 of the power shaft. When the impeller shaft 4 moves to the left, Figure 1, that is, away from the power shaft, this pin 16 strikes against the flanged edge of the collar 17 to thereby limit the movement. When the impeller moves in the reverse direction, that is, toward the power shaft, the pin 16 strikes against the end of the power shaft 6 and the movement of the impeller shaft is limited thereby.

By this arrangement, although the power shaft 5 is rigidly held against longitudinal movement, the impeller shaft is capable of limited longitudinal movement, being always urged towards the power shaft by the tension of spring 13.

The hub 20 of the impeller forms a shoulder 21 adjacent the shaft 4, which shoulder is machined flat and normal to the axis of the impeller shaft. A second and smaller shoulder 22 is formed a short distance from the shoulder 21, and the shaft immediately adjacent the latter shoulder is provided with threads 23. At the opposite end of these threads 23 a small shoulder 24 is formed, and the remaining portion of the impeller shaft 4 is machined smooth and true.

An anti-friction ring 25, preferably composed of carbon or of a carbon composition, is slipped over the free end of the shaft and positioned against the shoulder 21, where it is rigidly held in place by cementing as at 21' and by a nut 26 threaded upon the threads 23 on the shaft. This nut 26 is flanged to afford a large bearing surface against the anti-friction ring 25 and is provided with spanner sockets 27 by which it is tightened with a spanner wrench. A washer 28 abuts against the free end of the nut 26, and a second or lock nut 29 is threaded upon the thread 23 and against the washer 28 to lock the nut 26 securely in place.

A second and smaller anti-friction ring 30 fits around the shaft 4 and against the flanged face of the lock nut 29, the ring 30 being loose upon the shaft and capable of rotating with respect to it. The ring 30 is preferably also formed of carbon or of a carbon composition, and serves in cooperation with ring 25 to form a tight seal, as will presently appear.

A third anti-friction ring 31 is fitted over the nut 26 and between its flange and the washer 28, where it floats freely with respect to the shaft. This ring 30 is of such diameter as to hold the shaft against whipping.

The hub 3 of the impeller casing is counterbored as at 32 to form a pocket in which a metallic cage 33 is fitted. The bearing end of the hub 3 is closed by an end wall 34 which contains an opening 35 through which the impeller shaft loosely fits, and also contains a cylindrical socket 36 disposed concentrically of the shaft 4. The outer diameter of the cage 33 is machined to accurately fit in the socket 36, which automatically centers it in the hub concentrically with the axis of the shaft. The opposite end of the cage 33 is provided with an outwardly extending flange 37 whose outer periphery engages the inner surface of the counterbore 32, this flange being accurately machined to fit so that it holds the open end of the cage truly concentric with the counterbore.

The outer face of the flange 37 is machined flat and normal to the axis of the cage, so that it squarely engages the free face of the anti-friction ring 25.

The opposite end of the cage 33 is closed by an end wall 38 which contains a central opening through which the shaft 4 projects, that opening being provided with a plurality of grooves 39 for a purpose which will hereinafter appear. The inner face 40 of this end wall is machined flat and normal to the axis of the cage, that face engaging the free face of the carbon block 30 to form a seal.

The cage 33 is sealed in the hub by a packing material 41 which is disposed against the flange 37 and held tightly thereagainst by a spring 42 resting against a rigid ring 43. The spring 42 is anchored to the cage itself in any preferred manner such as by the pins 44. The outer edge of the ring 25 does not engage the inner face of the counterbore 32, but is spaced away therefrom a distance greater than the diameter of the particles of abrasive apt to be handled by the pump, so that particles will not lodge and grind away the ring and casing.

The cage end wall 38 is drilled to receive adjusting screws 45 which are threaded into the end wall 34 of the hub and which serve to move the cage longitudinally of the axis of shaft 4. The screws 45 project into the end of the cage and serve also to prevent it from rotating.

The operation of the flange is as follows: The ring 25 being cemented and tightly clamped upon the impeller shaft rotates with it and engages the flat surface of the flange 37 of the cage when the adjusting screws 45 are set to properly bring that flange into engagement with the ring. The face 40 of the end wall of the cage is spaced with respect to the engaging face of the flange 37 so that it simultaneously engages the free face of the carbon block 30. Since the carbon block 25 is tightly cemented and clamped upon the shaft 4 and against the shoulder 21 of the hub, no liquid can leak between it and the shaft. Liquid leaking past the outer periphery of the ring 25 is prevented from moving inwardly along the free face of the carbon ring by the engaging face of the flange 37 which tightly bears thereagainst, and is prevented from traveling along the outside of the cage 33 by the packing material 41. Some liquid may work its way between the flange 37 and the ring 25 into the interior of the cage, wherein it is trapped and prevented from escaping by the engagement of the end wall face 40 of the cage with the free face of the second ring 30, this ring thus cooperating with the main sealing ring 25 to form a tight seal.

It will be seen that the cage 33 is itself immovable both as regards to rotation around the axis of the shaft and as to movement longitudinally of the shaft. By reason of the fact that the impeller shaft 4 is capable of limited movement against the tension of spring 13, it is that spring which holds the anti-friction rings 25 and 30 tightly against their respective engaging faces of the cage. As the rings wear away, the seal will of course loosen up, and this wear is compensated for by readjusting the screws 45 to move the cage 33 longitudinally of the shaft and thereby bring its working surfaces into proper engagement with the sealing rings.

The third anti-friction ring 31 engages the inner surface of the cage and serves to prevent whipping of the impeller shaft, this ring not being depended upon as a sealing medium.

Since the spring 42 by which the tension is placed upon the packing material 41 is attached to the cage itself, that cage may be moved longitudinally without in any way affecting the tension maintained upon the packing material, and when this tension is once properly adjusted, it remains unchanged for a long period of time.

In order to provide for lubrication of the engaging faces of the sealing rings 25 and 30, I have provided a suitable lubricating device, preferably a spring pressed grease cup 50, which communicates with the interior of the cage by piping 51 threaded into the closed end of that cage. A duct 52 leads from the end of this pipe into the interior of the cage. The diameter of the sealing ring 30 is slightly less than the internal diameter of the cage so that a lubricant forced into the cage can pass freely past the ring. The internal ring 31 is provided with a plurality of grease grooves 53 to permit free passage of lubricant into engagement with the face of block 25 that engages the flange 37 of the cage. The interior of the cage is thus kept full of grease under pressure, and that grease and pressure aids in maintaining a tight seal. The grooves 39 in the end wall of the cage soon fill with grease and form a labyrinth packing which prevents leakage of grease along the shaft.

I have found that even with careful machining of the parts forming the packing gland of my invention, the surface 40 on the closed end of the cage and the bearing surface on the flange 37 do not engage their respective rings evenly when first assembled, and some lubricant leaks past the ring 30 into the grooves 39 in the end of the cage. After the rings have worn slightly and the adjusting screws are turned up to compensate for this wear, these two surfaces engage uniformly upon their respective anti-friction rings, and aided by the lubricant, form a tight seal which, although it is tight, has low frictional losses and the power loss due to friction is thereby minimized. I have found that by adjusting the adjusting screws so that when the pump is idle the cage moves the impeller shaft 4 against the tension of spring 13 by its engagement with rings 25 and 30, a tight seal may be maintained over a long period of time. When the pump is running, the suction on the impeller counteracts the pressure placed on the rings by the cage, so that the frictional losses are reduced thereby.

In pumps which are to handle corrosive liquids the pump casing, the impeller, the lock nuts 26 and 29 in the cage 33 are preferably made up of an acid-resistant alloy, and the anti-friction rings 25 and 30 are preferably carbon. The packing material 41 must of course also be acid-resistant. If the pump is used for non-corrosive liquids or liquids containing suspended abrasives, the metallic parts are preferably composed of iron, steel, bronze or the like. The particular materials used may of course be varied within the teachings of my invention.

While I have chosen to describe my invention by illustrating its installation in a pump having an overhanging impeller, I have done so by way of example only as the invention obviously is not limited to this particularly type of pump, nor is it limited to pumps as the gland may be used to seal any rotating shaft in a casing.

Having thus complied with the statutes and shown and described a preferred embodiment of my invention, what I consider new and desire to have protected by Letters Patent is pointed out in the appended claims.

What is claimed is:

1. The combination with a pump casing having a hub, an impeller in said casing and a shaft for said impeller extending concentrically through the hub but not engaging it, of a packing gland surrounding said shaft within said hub comprising a pair of carbon blocks engaging the shaft, means for definitely holding said blocks in spaced relation on said shaft, a cage surrounding said shaft but spaced away therefrom and fitting over one of said blocks, parallel faces on said cage engaging said blocks simultaneously, a packing means between the cage and hub, and means for holding the cage against rotation with the shaft and for moving it longitudinally of said shaft to compensate for wear of said blocks.

2. The combination of a pump casing, a counterbored hub on said casing, an impeller in the casing, a shaft on said impeller projecting concentrically through the hub, a shoulder on the impeller disposed at the junction of said casing and hub, an anti-friction ring disposed in said hub around the shaft and against said shoulder, means for locking said ring thereagainst, a second anti-friction ring around said shaft and against said locking means, a third anti-friction ring encircling said locking means, a cage disposed in said hub, parallel flat faces on said cage engaging said first and second rings, a cylindrical face on said cage engaging said third ring, means for holding said cage against rotation with said shaft, and a spring-pressed packing means between said cage and hub.

3. The combination of a pump casing, a counterbore hub on said casing, an impeller in the casing, a shaft on said impeller projecting concentrically through the hub, a shoulder on the impeller disposed at the junction of said casing and hub, an anti-friction ring disposed in said hub around the shaft and against said shoulder, means for locking said ring thereagainst, a second anti-friction ring around said shaft and against said locking means, a third anti-friction ring encircling said locking means, a cage disposed in said hub, parallel flat faces on said cage engaging said first and second rings, a cylindrical face on said cage engaging said third ring, means for holding said cage against rotation with said shaft, a packing means surrounding said cage, and a spring means anchored to said cage and bearing against said packing means to hold it tightly against the counterbored surface in said hub.

4. The combination of a pump casing, a counterbore hub on said casing, an impeller in the casing, a shaft on said impeller projecting concentrically through the hub, a shoulder on the impeller disposed at the junction of said casing and hub, an anti-friction ring disposed in said hub around the shaft and against said shoulder, means for locking said ring thereagainst, a second anti-friction ring around said shaft and against said locking means, a third anti-friction ring encircling said locking means, a cage disposed in said hub, parallel flat faces on said cage engaging said first and second rings, a cylindrical face on said cage engaging said third ring, means for holding said cage against rotation with said shaft, a packing means surrounding said cage, a spring means anchored to said cage and bearing against said packing means to hold it tightly against the counterbored surface in said hub, and means for forcing a lubricant into said cage to lubricate the bearing surfaces of said first, second and third rings.

5. A packing gland for sealing a shaft in a housing comprising a pair of anti-friction rings carried by the shaft, means for spacing said rings on the shaft, a cage fitting over one of said rings and extending toward the other, parallel flat faces on said cage, means for moving the cage longitudinally of the shaft to bring said faces into engagement with said rings, said means also holding the cage against rotation, a third ring bearing against said spacing means and the inside surface of said cage to hold the shaft truly concentric therewith, and a packing means between said cage and said housing.

6. A packing gland for sealing a shaft in a housing comprising a pair of anti-friction rings carried by the shaft, means for spacing said rings on the shaft, a cage fitting over one of said rings and extending toward the other, parallel flat faces on said cage, means for moving the cage longitudinally of the shaft to bring said faces into engagement with said rings, said means also holding the cage against rotation, a third ring bearing against said spacing means and the inside surface of said cage to hold the shaft truly concentric therewith, a packing means between said cage and said housing, and a spring attached to said cage and bearing against said packing means to maintain a tight seal.

7. The combination with a pump casing, a hollow power shaft having a socket in its end adjacent the casing, and means for holding the shaft with its axis coincident with the axis of the casing, of an impeller in said casing, a shaft therefor projecting into said socket, a key for keying said shafts together in said socket, spring means for pulling said impeller shaft longitudinally of its axis toward said power shaft, a pin on said impeller shaft, means carried by said power shaft and cooperating with said pin to limit the longitudinal movement of said impeller shaft, a packing ring carried by said shaft and fixed against movement longitudinally of it, and a stationary packing member against which said ring is held by said spring means.

8. The combination with an impeller shaft which projects through a pump casing hub, of a packing gland for said shaft, located in said hub and comprising a stationary open-ended cage surrounding said shaft but spaced away therefrom, a pair of anti-friction rings carried by the shaft, a pair of planar faces on said cage disposed normal to the axis thereof, each of said faces engaging one of said rings, and means for maintaining said cage full of lubricant under pressure.

9. The combination with an impeller shaft which projects through a pump casing hub, of a packing gland for said shaft, located in said hub and comprising a stationary open-ended cage surrounding said shaft but spaced away therefrom, a pair of anti-friction rings carried by the shaft, a pair of planar faces on said cage each engaging a corresponding face on one of said rings, a third anti-friction ring carried by said shaft, said third ring engaging the inside surface of said cage, said latter ring being grooved, and means for forcing lubricant into said cage and through said grooves, said means maintaining the cage full of lubricant under pressure.

10. In a sealing device for a pump, the combination of a pump casing having a hollow hub fixed on the back of the casing, a runner shaft projecting through said hub, a circular sealing shoulder mounted non-rotatably in said hub, a circular sealing shoulder fixed on the runner shaft and adapted to cooperate with the first named sealing shoulder in the hub to provide a liquid seal, a stationary bearing spaced from the hub, a hollow driving shaft mounted in said bearing for rotation and held against longitudinal motion, said runner shaft being telescoped with respect to said driving shaft and said telescoped shafts having splined driving connection, and a tension member extending through said hollow driving member to pull the shafts resiliently endwise together and thereby to hold said shoulders together in sealing relation.

11. In a sealing device for a pump, the combination of a pump casing having a hollow hub fixed on the back of the casing, a runner shaft projecting through said hub, a circular sealing shoulder mounted non-rotatably in said hub, a circular sealing shoulder fixed on the runner shaft and adapted to cooperate with the first named sealing shoulder in the hub to provide a liquid seal, a stationary bearing spaced from the hub, a hollow driving shaft mounted in said bearing for rotation and held against longitudinal motion, said runner shaft being telescoped with respect to said driving shaft and said telescoped shafts having splined driving connection, a tension member extending through said hollow driving member to pull the shafts resiliently endwise together and thereby to hold said shoulders together in sealing relation, and means for advancing said first sealing shoulder axially of the shaft against the sealing shoulder on the shaft to take up the wear between said sealing shoulders and thereby to prevent engagement of the runner on the shaft with the casing wall.

HARRY E. LA BOUR.